United States Patent
Ries

(10) Patent No.: US 7,061,147 B2
(45) Date of Patent: Jun. 13, 2006

(54) SUPERCONDUCTING ELECTRICAL MACHINES FOR USE IN NAVY SHIPS

(75) Inventor: Günter Ries, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/488,032

(22) PCT Filed: Aug. 30, 2002

(86) PCT No.: PCT/DE02/03239

§ 371 (c)(1),
(2), (4) Date: Feb. 27, 2004

(87) PCT Pub. No.: WO03/019759

PCT Pub. Date: Mar. 6, 2003

(65) Prior Publication Data

US 2004/0245865 A1    Dec. 9, 2004

(30) Foreign Application Priority Data

Aug. 30, 2001  (DE) .............................. 101 43 713
May 29, 2002  (DE) .............................. 102 24 014

(51) Int. Cl.
 H02K 9/00   (2006.01)
 H02K 55/00  (2006.01)

(52) U.S. Cl. .................... 310/54; 310/51; 310/52; 310/61; 440/6

(58) Field of Classification Search .............. 310/51, 310/54, 52, 61; 440/6
See application file for complete search history.

(56) References Cited

U.S. PATENT DOCUMENTS

| | | | | |
|---|---|---|---|---|
| 1,243,358 A | * | 10/1917 | Stoddard | 310/272 |
| 2,729,443 A | * | 1/1956 | Olinger | 267/141 |
| 3,386,256 A | * | 6/1968 | Alexander | 62/50.7 |
| 3,452,703 A | | 7/1969 | Becker | 440/58 |
| 4,040,378 A | | 8/1977 | Blanchard | 440/52 |
| 4,176,291 A | | 11/1979 | Rabinowitz | 310/52 |
| 4,219,224 A | * | 8/1980 | Hanley | 285/47 |
| 5,053,663 A | | 10/1991 | Boer et al. | 310/91 |
| 5,193,349 A | | 3/1993 | Laverman et al. | 62/64 |
| 5,403,216 A | | 4/1995 | Salmi et al. | 440/6 |
| 5,795,199 A | * | 8/1998 | Langenberg et al. | 440/79 |

(Continued)

FOREIGN PATENT DOCUMENTS

CA    1311657    12/1992

(Continued)

Primary Examiner—Darren Schuberg
Assistant Examiner—Erik Preston
(74) Attorney, Agent, or Firm—Harness, Dickey & Pierce, P.L.C.

(57) ABSTRACT

Superconducting electrical machines, for example motors or generators, especially high-temperature superconducting machines, include a rotor equipped with superconductors, especially high-temperature superconductors. They further include a rotor cryostat, a rotor shaft and a cryostatic link including a cryostatic conductor between the cryostat and a frigorific apparatus, and a non-superconducting stator. The machines are adapted to be resistant to shocks as required for navy ships. The stator, the rotor and the cryostat are motion-decoupled from an outer machine housing and the rotor shaft by elastic elements. In one embodiment, the machine housing is configured as a thruster housing and is elastically linked with the stern of the ship.

32 Claims, 10 Drawing Sheets

U.S. PATENT DOCUMENTS

| | | | |
|---|---|---|---|
| 6,045,112 A * | 4/2000 | Kirkwood | 248/634 |
| 6,116,179 A * | 9/2000 | Swinbanks et al. | 114/269 |
| 6,165,031 A * | 12/2000 | Lonngren et al. | 440/51 |
| 6,489,701 B1 * | 12/2002 | Gamble et al. | 310/179 |
| 6,583,532 B1 * | 6/2003 | Hein et al. | 310/260 |
| 6,790,109 B1 * | 9/2004 | Heer et al. | 440/53 |
| 6,869,367 B1 * | 3/2005 | Herdin et al. | 464/177 |
| 2003/0148679 A1 * | 8/2003 | Matsuda | 440/88 G |
| 2004/0056541 A1 * | 3/2004 | Steinmeyer | 310/52 |

FOREIGN PATENT DOCUMENTS

| | | |
|---|---|---|
| DE | 35 19 103 A1 | 12/1986 |
| DE | 196 47 948 A1 | 7/1997 |
| DE | 196 48 417 A1 | 5/1998 |
| DE | 198 26 229 A1 | 2/1999 |
| DE | 199 02 837 C1 | 8/2000 |
| DE | 101 10 674 A1 | 9/2002 |
| EP | 0 533 359 B1 | 3/1993 |
| EP | 0 865 595 B1 | 9/1998 |
| EP | 1 010 614 B1 | 6/2000 |
| FR | 2 722 207 | 6/1999 |
| JP | 60 087661 | 5/1985 |
| JP | 60 125163 | 7/1985 |
| JP | 03128663 A * | 5/1991 |
| JP | 041005547 A * | 4/1992 |
| JP | 10 257752 | 9/1998 |
| WO | WO 97/49605 | 12/1997 |
| WO | WO 00/13296 | 3/2000 |
| WO | WO 02/30742 A1 | 4/2002 |

* cited by examiner

SUPERCONDUCTING ELECTRICAL MACHINES FOR USE IN NAVY SHIPS

This application is the national phase under 35 U.S.C. § 371 of PCT International Application No. PCT/DE02/03239 which has an International filing date of Aug. 30, 2002, which designated the United States of America and which claims priority on German Patent Application numbers DE 101 43 713.7 filed Aug. 30, 2001, and DE 102 24 014.0 filed May 29, 2002, the entire contents of which are hereby incorporated herein by reference.

FIELD OF THE INVENTION

The present application generally relates to the field of electrical machines, for example motors or generators, based on superconducting technology; in particular based on high-temperature superconducting technology.

BACKGROUND OF THE INVENTION

In the past, it has already been proposed for conventional electrical machines, for example motors or generators, to be designed using superconducting technology, in order to improve the efficiency of these machines and to make it possible to implement space-saving concepts. Corresponding laboratory machines have also already been developed and have been introduced to the public in the USA and Germany. However, they have not yet been implemented for practical operation on vessels, since the technical difficulties, particularly in the case of navy vessels with their particularly stringent requirements for shock resistance, resistance to vibration etc., mean that they have not yet been considered to be feasible.

SUMMARY OF THE INVENTION

An object of an embodiment of the invention is to specify electrical machines based on superconducting technology, in particular based on high-temperature superconducting technology, which are designed to be suitable for practical use and may be used without any problems in navy vessels. One object in particular is to specify an electrical propulsion motor based on superconducting technology for steering propellers, in which the specific advantages of superconducting technology can lead to a particularly lightweight propulsion system, which allows a streamlined stern shape and leads to a slim vessel configuration.

Suitable electrical machines for navy vessels are already known. These machines are large and heavy. In terms of movement, they are not integrated in the vessels. The same applies to electrical steering propeller motors, as are disclosed in WO 02/30742 A1 and in DE 196 47 948 A1. Although these motors are decoupled from their housing in terms of vibration, they are, however, large and heavy owing to the air cooling which is normally provided.

One particular object of an embodiment of the invention is to specify the individual components of an electrical machine based on superconducting technology and which is suitable for a navy vessel and can withstand accelerations of the part of the vessel in which it is arranged up to more than 100 g. A superconducting machine can thus also be used without any restrictions for the navy.

The electrical machine according to an embodiment of the invention, irrespective of whether it is a motor, for example an electric motor for an electrical steering propeller, or a motor for a conventional propeller or water jet which is arranged in the navy vessel in order to increase the flank speed, or whether it is a generator for generating electrical power for any desired electrical loads, always has the specific advantages of the high efficiency, the small dimensions and the low weight of a superconducting electric motor or generator.

Detailed information for the major elements of the super conducting motor or generator, in particular based on a high-temperature superconductor configuration, is already available, for example about the cryogenic distributor in WO 00/13296. The same information relating to the coupling between the cold rotor shaft part and the shaft part which is passed to the exterior is available in German Patent Application document 101 10 674.2 and information about cold heads is available from European document EP 0 865 595 B1. Details about compressor units and about accessories for cryogenic refrigerators are known, for example, from the descriptions and operating instructions from the Leybold Company for their RGS or Coolpak types.

In summary, it can be stated that the components which are intended to be used in a new combination and in a modified form which is significant to the invention for the motors and generators for navy vessels, are in principle already known from various fields of technology, for example from nuclear magnetic resonant imaging, from superconducting current limiters, or from similar products.

A further object of an embodiment of the invention relates to the specific field of propulsion devices for vessels and is applicable to the design configuration of an electric motor which includes a stator and a rotor and is arranged in a streamlined housing which can be arranged like a gondola on the lower surface of the hull of a vessel, and in which the rotor is supported by a shaft which is mounted in the housing and to which at least one propeller is coupled.

In one known propulsion device of this type, the rotor is in the form of a rotor with permanent-magnet excitation and includes a supporting structure with a tube-like mounting body and a magnetically active part. The rotor is arranged on a propulsion shaft to which at least one propeller is fitted and which is mounted in the housing of the propulsion device. The stator, has an electrically and magnetically active part, is fitted into the housing of the propulsion device such that power can be transmitted.

The electric motor is in this case cooled by heat dissipation via the housing to the surrounding water. In order to cool the end windings of the stator, air or an insulating oil can be circulated in the interior of the housing (WO 97/49605). Alternatively, it is possible to use a special thermal bridge (DE 199 02 837 A1). Additional cooling measures may comprise the use of closed-cycle coolers which are arranged in the casing-like mount part of the propulsion device (DE 198 26 229 A1).

In another known propulsion device with an electric motor that is arranged like a gondola, the stator is arranged with a radial gap in the housing, in order to make it possible to cool the stator and the rotor with a gaseous coolant which is supplied from the hull of the vessel via specific cooling channels (U.S. Pat. No. 5,403,216).

Against the background of a propulsion device, an embodiment of the invention is based on an object of designing the propulsion device such that it can withstand shock loads and is thus also suitable for applications in fields of operation in which severe underwater pressure waves may occur. This embodiment is in this case intended to be suitable for high-temperature superconducting propulsion devices.

In order to achieve this object, an embodiment of the invention provides for the stator to be fixed on the rotor via rotating bearings, and for the unit which is formed from the stator and rotor to be supported both on the housing and on the propulsion shaft.

In a refinement of the propulsion device such as this, the electrically and magnetically active parts of the propulsion motor, which have a high mass, form a unit which is mounted within the housing and in a "damped" manner on the propulsion shaft. In the event of sudden pressure effects acting on the housing and the propulsion shaft of the propulsion device from the outside, these pressure effects act with a time delay and thus with a reduced shock effect on the electrically and magnetically active parts of the motor. The mechanical forces which act on the hull of the vessel via the suspension of the propulsion device (which is arranged like a gondola), in particular bending moments, are thus reduced.

The elastic and damped arrangement of the electrically and magnetically active parts of the electric propulsion motor also results in a reduction in the structure-borne sound which originates from the propulsion device, thus making it harder to use sonar to locate a vessel which is equipped with a propulsion device such as this. The rigid mechanical coupling between the rotor and the stator of the electric propulsion motor has the further advantage in the case of motors in which the rotor is fitted with permanent magnets for excitation purposes that the air gap between the rotor and the stator remains constant even in the event of shock loads on the propulsion device, and can thus be chosen to be very small.

In one refinement of an embodiment of the invention, the rotor includes a tube-like mounting body and an active part which is fitted to the mounting body and is elastically supported on the propulsion shaft, while the stator is mounted on the mounting body of the rotor and is elastically supported on the housing. In this case, it is expedient for the rotor to be mounted softly on the propulsion shaft both in the axial direction and in the radial direction, but to be designed to be torsionally stiff in the circumferential direction.

The radially rigid mounting of the stator on the mounting body of the rotor is expediently achieved by commercially available radial and axial bearings, which are preferably in the form of roller bearings. Sliding bearings are in contrast expediently used for the bearings for the rotor shaft, preferably those with hydrostatic oil circulation.

Commercially available damping elements may be used for the elastic support of the rotor on the shaft, such as those which are normally used, for example, for elastic couplings in a shaft run. The essential feature of damping elements such as these is that they are designed to be elastic in the radial and axial directions of the rotor and to be torsionally stiff in the circumferential direction of the rotor.

The same types of damping elements can be used for the elastic support of the stator on the housing of the propulsion device as for supporting the rotor on the shaft.

Since the elastic support of the stator on the housing of the propulsion device results in a space being formed between the stator and the housing, the stator cannot be cooled solely by heat dissipation via the housing to the surrounding water. Additional cooling measures must therefore be provided. This could be done by the use of closed-cycle coolers, which are arranged in the area of the wall of the supporting casing which connects the propulsion device to the hull of the vessel, or in the hull of the vessel, with a liquid coolant, in particular water, flowing through this closed-cycle cooler as well as through corresponding holes in the laminated stator core and in a cooling ring which surrounds the laminated core. Cooling such as this may also be used for the end windings of the stator.

Apart from this, circulating air flow can also be produced, which flows around the end windings of the stator and is cooled down in the area of the supporting casing for the propulsion device. If required, the bilge areas of the propulsion device, that is to say the housing parts which are arranged at the ends of the propulsion shaft, can also be used for cooling-down purposes.

An electrical steering propeller which can be rotated is known from Canadian Patent 1,311,657. This steering propeller is arranged under the stern of an icebreaker. The casing and its connection to the stern of the vessel are designed especially for icebreaking tasks.

A further object of an embodiment of the invention is to specify an electrical steering propeller which is likewise specifically designed for a task, namely for propulsion of a navy vessel. One necessary feature for this object is for the electrical steering propeller to be able to withstand high accelerations caused by underwater explosions. In this case, it must be designed to be light, in order to take account of the slim stern configuration of navy vessels.

The main object is achieved in that the vessel stern casing connection, the casing and the motor are designed such that the vessel stern, the casing and the motor can withstand underwater explosion pressure waves without being damaged, for which purpose the casing is itself designed to be elastically deformable, the vessel stern casing connection is designed to allow movements of the casing with respect to the vessel stern, and the electric motor is designed to absorb accelerations of more than 10 g. Features according to the solution result in the electrical steering propeller being designed appropriately for its object and having the capability to be used for navy vessels which are subject during operation to the risk of a torpedo hit or of a torpedo or a mine exploding underneath the vessel. The resistance is better than that of conventional rudders.

The configuration of a modern navy vessel is described in the article by Karl Otto Sadler, "Trends im Überwasser-Marineschiffbau" [Trends in the construction of surface navy vessels] in the Journal "Marineforum" [Navy Forum], Issue 6, 1999, pages 8 to 29. The electrical steering propeller according to an embodiment of the invention is intended in particular to be suitable for modern navy vessels such as these.

One refinement of an embodiment of the invention provides for the casing of the electrical steering propeller to have at least one elastic articulation point, for example a joint, between individual parts of the casing. The joint advantageously has flanges with a screw connection, which is designed to flex elastically and, for example, has cup springs. An elastic joint intermediate layer composed of an elastomer material preferably in a multilayer and reinforced form, for example silicone rubber, is advantageously arranged in the joint.

These joints that are provided according to an embodiment of the invention result in articulation points for the casing, so that it can behave elastically. This makes it possible to dissipate explosion pressure wave forces which act on the motor at the lower end of the casing and on the junction point between the casing and the stern. The solution according to an embodiment of the invention is in this case sufficiently robust to satisfy the requirements and is very advantageously effective for dissipation of explosion pressure waves.

A joint collar is advantageously provided on the outside around the joint, is composed of elastic, in particular elastomeric material, and prevents water from entering the joint during movement of the casing parts.

Provision is also advantageously made not only for the housing of the electric motor to be formed from two or more parts, with individual parts of the housing preferably being composed of aluminum, but also for the casing to be formed from more than two parts, with aluminum, or else fiber-reinforced plastics, in some cases also with steel or aluminum flanges preferably also being provided in this case. This results in considerable saving in weight, or else an increase in the elasticity of the casing.

A further refinement of an embodiment of the invention provides for the electric motor to have an elastic rotor bearing and a large air gap which is, for example, between 5 and 50 mm. This makes it possible to reliably prevent the rotor from striking the stator part of the electric motor even when very high accelerations occur (accelerations may be more than 100 g). The large air gap in conjunction with an elastic rotor bearing and the use of sliding bearings instead of roller bearings achieves the surprisingly high capability for the electric motor to withstand acceleration, according to an embodiment of the invention.

The large air gap can be achieved particularly advantageously without any reduction in efficiency by using HTS (high-temperature superconductor) rotors. An air gap three-phase winding is particularly advantageous for this purpose. The use of an HTS rotor in this case has the particular advantage that it can be designed to be particularly small, and the stator windings are also correspondingly small. Thus, this may result in a very small electrical machine which can be designed to be explosion-proof and shock-proof without in the process being less efficient than conventional machines. The measures as described above (use of a motor with HTS technology, use of aluminum or plastic instead of steel) and the further measures mentioned in the following text make it possible, for example, to reduce the weight of a 7 MW steering propeller highly advantageously from about 120 t to about 65 t.

A further advantageous refinement of an embodiment of the invention includes the vessel stern casing connection in the vessel stern having elastically deformable structural elements, for example highly flexible metal sheets, which form elastically deformable mount cells. This makes it possible to dissipate not only the explosion pressure forces which act on the stern of the vessel via the casing but also the explosion pressure waves which act directly on the stern of the vessel.

A further refinement of an embodiment of the invention provides for the power supply lines for the electric motor to be designed without sliprings, for example in the form of a rotationally elastic cable run or a helical spread cable. The lack of a slipring body saves a considerable amount of weight on the steering propeller and, furthermore, this removes one possible fault source which should not be ignored in the event of severe movements, for example in the event of an explosion pressure wave. The lack of a slipring body admittedly restricts the capability to rotate the electrical steering propeller to 120 to 180°, but this is acceptable because the electrical steering propeller can be rotated back from extreme positions again and does not need to be rotated any further in the same rotation direction.

A further refinement of an embodiment of the invention provides for the electrical steering propeller to have an auxiliary rudder, which can move independently of the position of the casing. Thus, in normal conditions, the casing can be fixed, with minor vessel direction changes being carried out by way of the auxiliary rudder.

The auxiliary rudder may be arranged on the trailing edge of the casing in the same way as the elevator on an aircraft tailplane. However, its effect here is restricted since it is located in the vortex train behind the casing. It is particularly advantageous for the auxiliary rudder to be in the form of a side or leading-edge vane, particularly in conjunction with an asymmetric profile corresponding, in particular, to an airfoil profile. This results in the effect of the side or leading-edge vane being particularly good.

A particularly resistant embodiment of the electric motor provides for the electric motor to be in two parts and to have two parts which can be operated independently of one another, in particular are supplied with power independently of one another, and for which open-loop and closed-loop control can be provided independently of one another. Each of these two electric motor parts may drive a propeller, thus resulting in redundantly operating electric motors and the capability to provide contrarotating propellers easily. This leads to an improvement in the efficiency of the propulsion system. An electric motor configuration such as this is particularly advantageous for relatively small navy vessels, such as high-speed boats.

In order to save weight, an embodiment of the invention provides for the capability to rotate the casing and/or to move the auxiliary rudder by means of electric servomotors. This particularly advantageously results not only in the casing rotation apparatus being lightweight, but also in a particularly quiet casing rotation apparatus since there is no need for the hydraulic motors which otherwise run continuously. In this case, it is particularly advantageous that the electric servomotors allow specific ramp forms to be achieved easily during start-up and during swiveling to a desired nominal position. The turning movement of the vessel can thus be completed particularly quickly and controlled in a suitable manner.

One particularly advantageous embodiment of an embodiment of the invention provides for the vessel stern casing connection to be designed to be elastic in a specific manner. A semi-universal-joint suspension for the casing or the use of spherical segments, in particular sprung spherical segments, to support the casing are advantageous for this purpose. Mounting the casing upper part in spherical segments in this case has the particular advantage that it is both robust and allows large flexing movements for the casing. Both semi-universal-joint suspension and the support of the casing via spherical segments are in this case achieved with the assistance of spring elements, for example elastomer or hydraulic cushions. These are advantageously supported horizontally and vertically on a moving mount structure, which also advantageously has steering elements. A defined movement can thus be achieved, with large flexing movements for the casing.

Finally, one refinement of an embodiment of the invention also provides for the electric motor to be provided with windings which are shrunk in the motor housing, and with external wall cooling. This results in the motor gondola having a particularly small volume, with a small area for shockwaves to act on. In conjunction with the capability of the casing to move elastically, this thus results in an optimum configuration for the electrical steering propeller, which satisfies the requirements for an electrical steering propeller—lightweight, small, resistant to shocks—in a manner which has not been achieved in the past.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
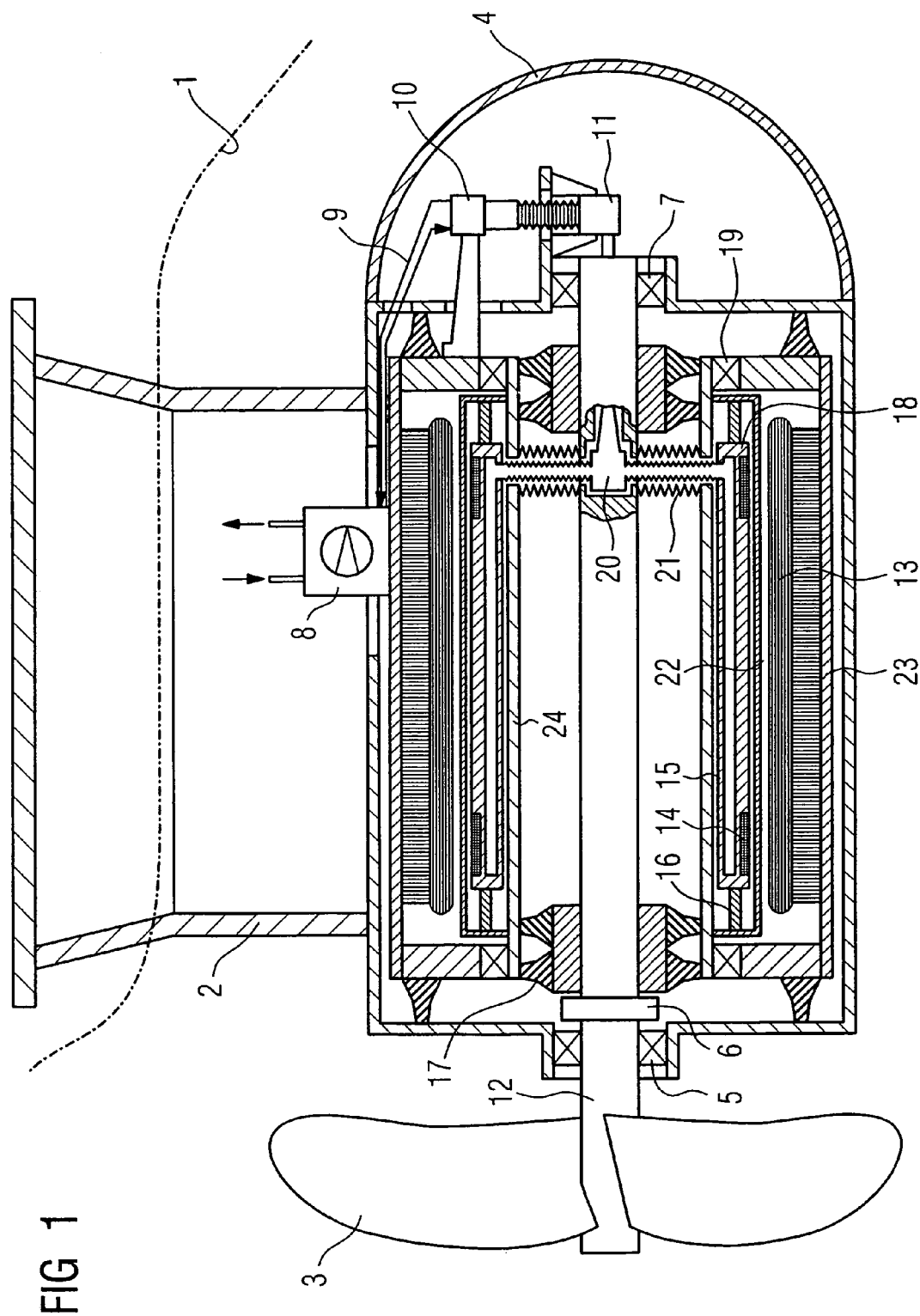
FIG. 1 shows an outline section through an HTS version of an electrical steering propeller.

In FIG. 1, 1 denotes the contour of the hull of the vessel, in which a steering propeller casing 2 is arranged such that it can rotate and can flex elastically. The propeller of the electrical steering propeller is annotated 3, in this case being single traction or pusher propeller. One shaft end therefore advantageously remains free in the housing for the introduction of the coolant. The housing of the electrical steering propeller is annotated 4, and rotor shaft 12 (which acts as the propulsion shaft at the same time) is arranged centrally in it, with bearings 5 and 7.

The compressor for a cooling unit 8 is arranged in the steering propeller casing 2, for example on the upper part of the motor housing 23, and is connected by way of a closed-cycle cooling system, which is not shown in any more detail, to the cooling system of the vessel or of the electrical steering propeller. A flexible compressed-gas feed and return line 9 is arranged between the compressor 8 and a cold head 10, and feeds compressed gas to the cold head 10. The cold head 10 is connected to a cryogenic coupling 11, which is known per se and passes the coolant (which has been cooled down in the cold head) to the rotating cryogenic distributor 20, from which it is passed via the flexible line 21 to the cryostat 15.

The superconducting winding 14, in particular a high-temperature superconducting winding, is located in the vacuum-insulated rotor cryostat 15 and is connected to the hot rotor cryostat 15 via a torque transmission coupling 16 with low thermal conductivity. The rotor tube 24 is connected via damping elements 17 to the shaft 12 of the electrical steering propeller, and is supported via bearings 19 on the end flange of the housing 23. The stator 13 is located externally in the housing 23, and a relatively large air gap 22 is formed between it and the rotor 18.

The air gap is of such a size as to ensure that elastic deformation of the rotor 18 and/or of the stator 13 as well as the bearing plate of the bearing 19 remain less, overall, than their movements under the influence of shock. This therefore ensures correct operation even in the event of an underwater explosion, for example directly underneath the electrical steering propeller.

The rotor tube 24 is connected to the rotor shaft 12 via damper 17, with the same dampers as those between the rotor tube and the housing advantageously being used here. Overall, this results in a solution with very low cold losses, and with good shock resistance at the same time.

Figure 2:
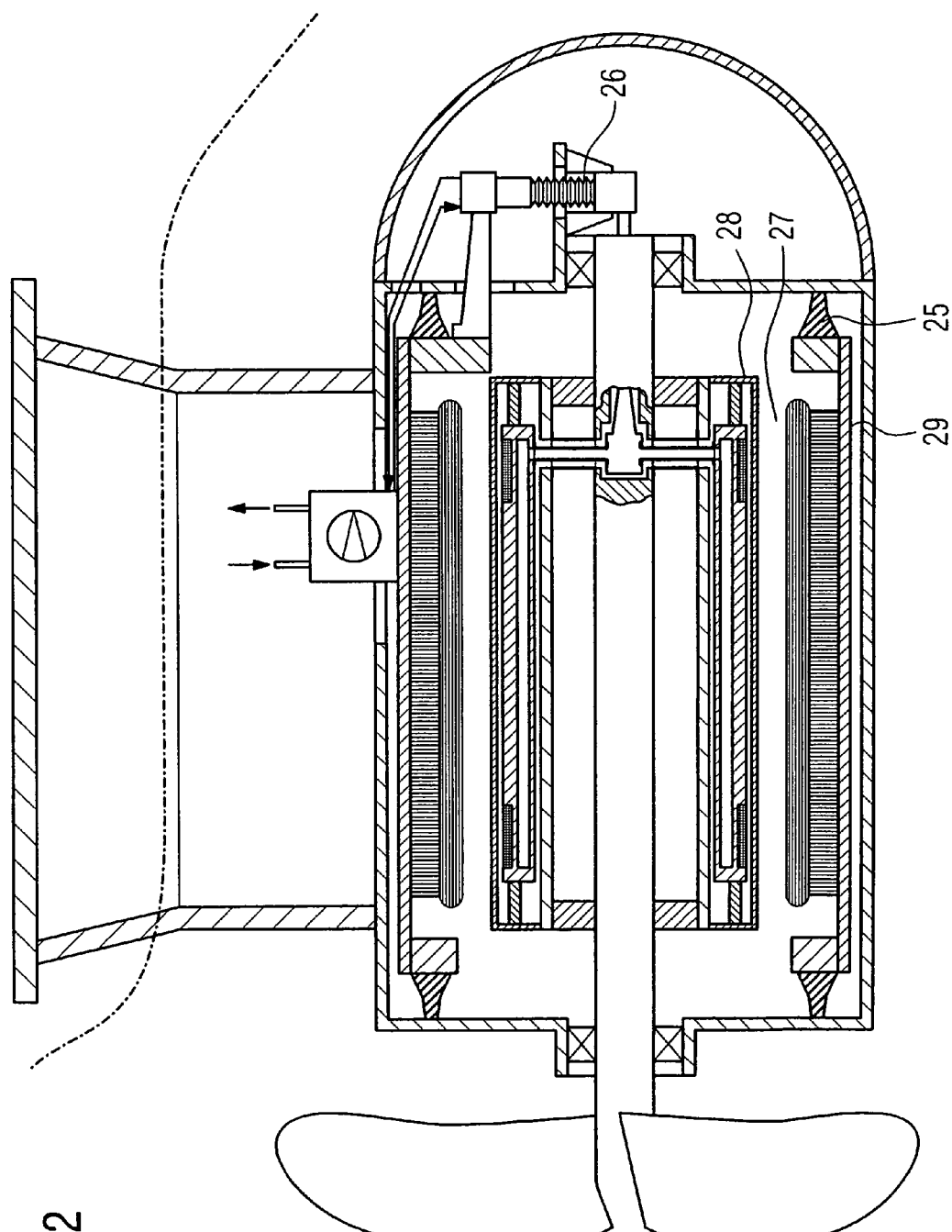
FIG. 2 shows an outline section through an electrical steering propeller with simplified movement decoupling.

The high ampere-turns figure which can be achieved with superconducting windings is utilized in FIG. 2, which shows a simplified embodiment, in which individual parts of the machine correspond to those in FIG. 1 and are therefore not shown again. The rotor requires only a small conductor mass and can be designed with little iron, or no iron. Shock forces on the small mass of the rotor are then small, or comparable with forces that occur during operation.

The rotor is connected to the shaft without any damping; the cryogenic coupling is connected to the coolant area via a rigid, vacuum-insulated line. The heavy stator and the cryogenic cooler are suspended via dampers 25, with only one flexible connection 26 being required for the cold head-cryogenic coupling. The air gap 27 between the rotor and the air gap stator winding is in this case chosen to be sufficiently large, up to 50 mm, that the rotor and the stator 28, 29 do not touch even in the event of the maximum shock load. This results in a particularly lightweight, simple embodiment of the superconducting machine.

Figure 3:
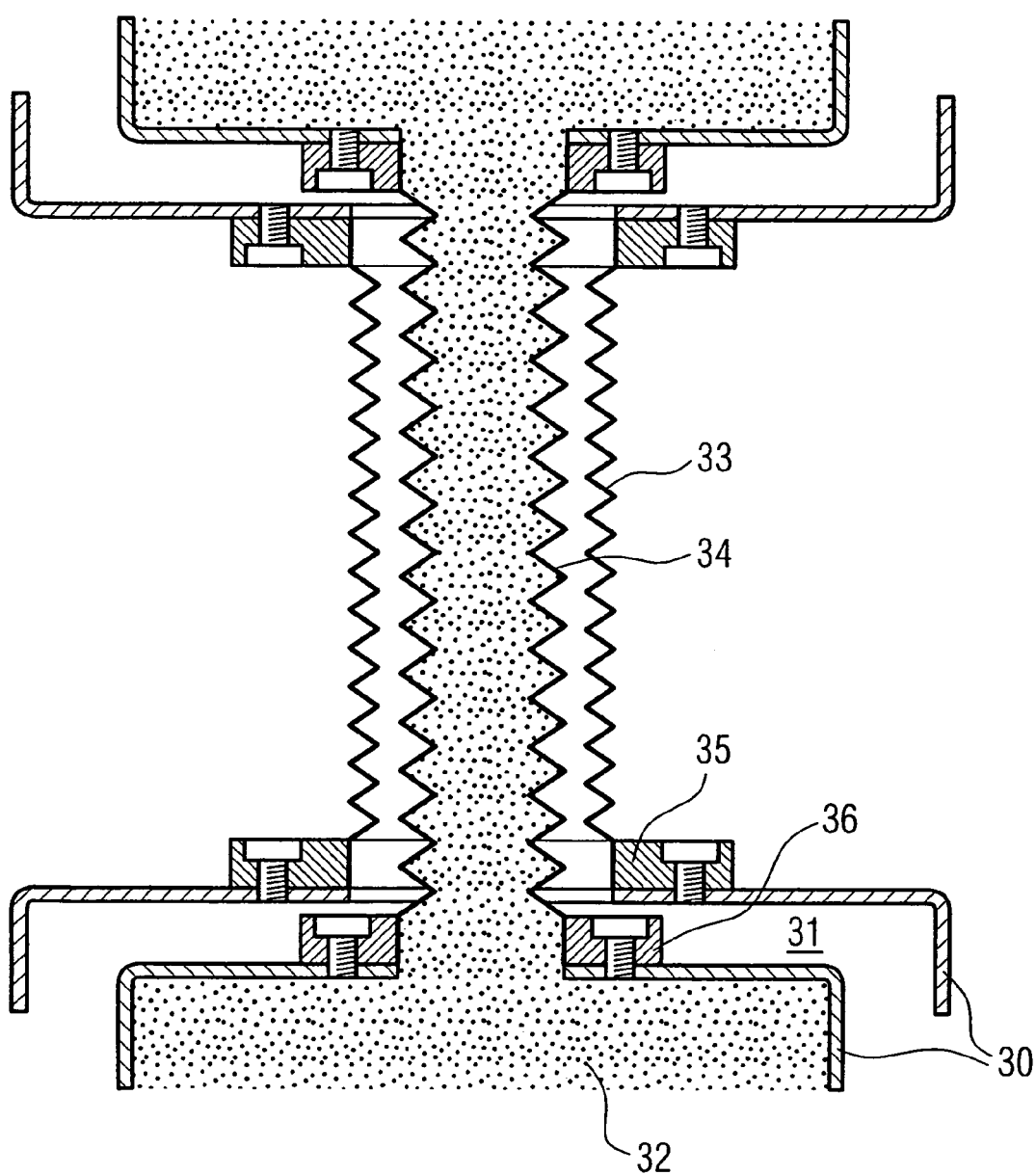
FIG. 3 shows an elastic coolant line in the motor.

FIG. 3 shows a flexible coolant line as is required, for example, for the machine. There is a vacuum 31 in a double-walled housing 30, and this continues between the two flexible coolant line parts 33 and 34. These flexible coolant parts are connected via flanges 35, 36 to the walls which enclose the coolant 32. Overall, this results in a simple embodiment, which allows only minor heat losses, for a coolant line.

Figure 4:
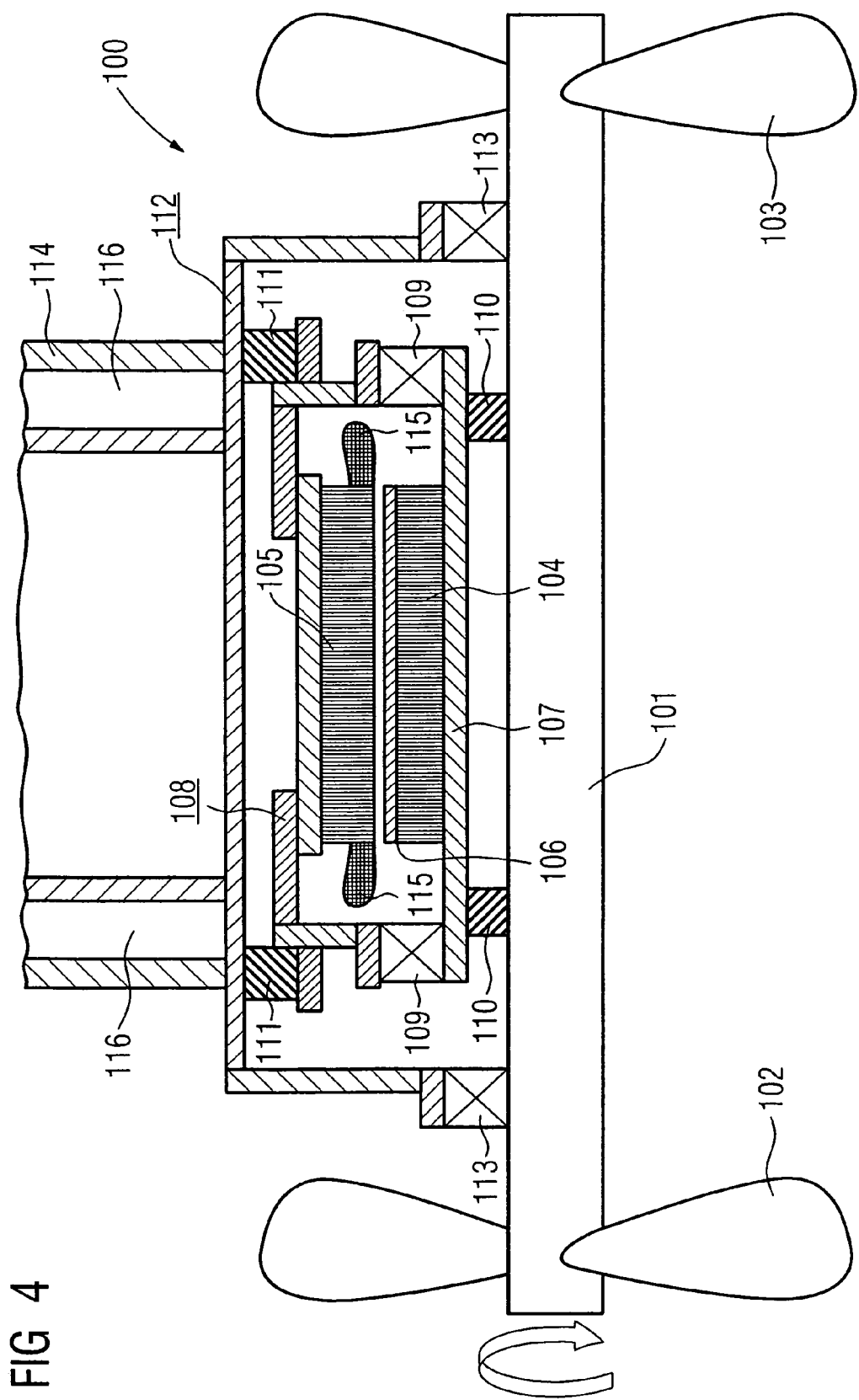
FIG. 4 shows a propulsion device, illustrated schematically in the form of a longitudinal section.

FIG. 4 shows the propulsion shaft 101 of an electric-motor propulsion device 100 for a vessel, with the propulsion shaft being fitted with one propeller 102 and 103 at each end. Only the upper half of the electric motor which drives the propulsion shaft 101 is illustrated, in the form of a section. This electric motor comprises a rotor 104 and a stator 105, with the rotor having an electrically active layer 106 in the form of permanent magnets, and being arranged on a tube-like mounting body 107. The stator 105 has a mounting housing 108 with two or more parts and which is fixed via rotating bearings 109 on the mounting body 107 of the rotor.

The unit including the rotor 105 and the stator 106 is supported by means of elastic damping elements 110 and 111 firstly on the propulsion shaft 101 and secondly on a housing 112 which holds the electric motor and the propulsion shaft. The propulsion shaft 101 is in this case mounted in the housing 112 via rotating bearings 113.

The housing 112 has an associated mounting casing 114 for attaching the propulsion device 100 to the hull of the vessel. The mounting casing 114 may have a double-walled configuration or may be provided with cooling channels 16 which surround it vertically, for example in order to carry cooling air.

In order to cool the stator 105, in particular the end windings 115, cooling air, for example, may be fed from the mounting casing 114 at one end of the electric motor into the internal space between the mounting housing 108 and the mounting body 107, and can be carried away at the other end of the electric motor. The cooling air could flow within the electric motor between the electrically active layer 106 of the rotor and the mounting body 107 in the axial direction. The stator housing 108 could have flow channels for cooling the stator and the stator windings, through which cooling water that is supplied from the mounting casing 114 flows.

Figure 5:
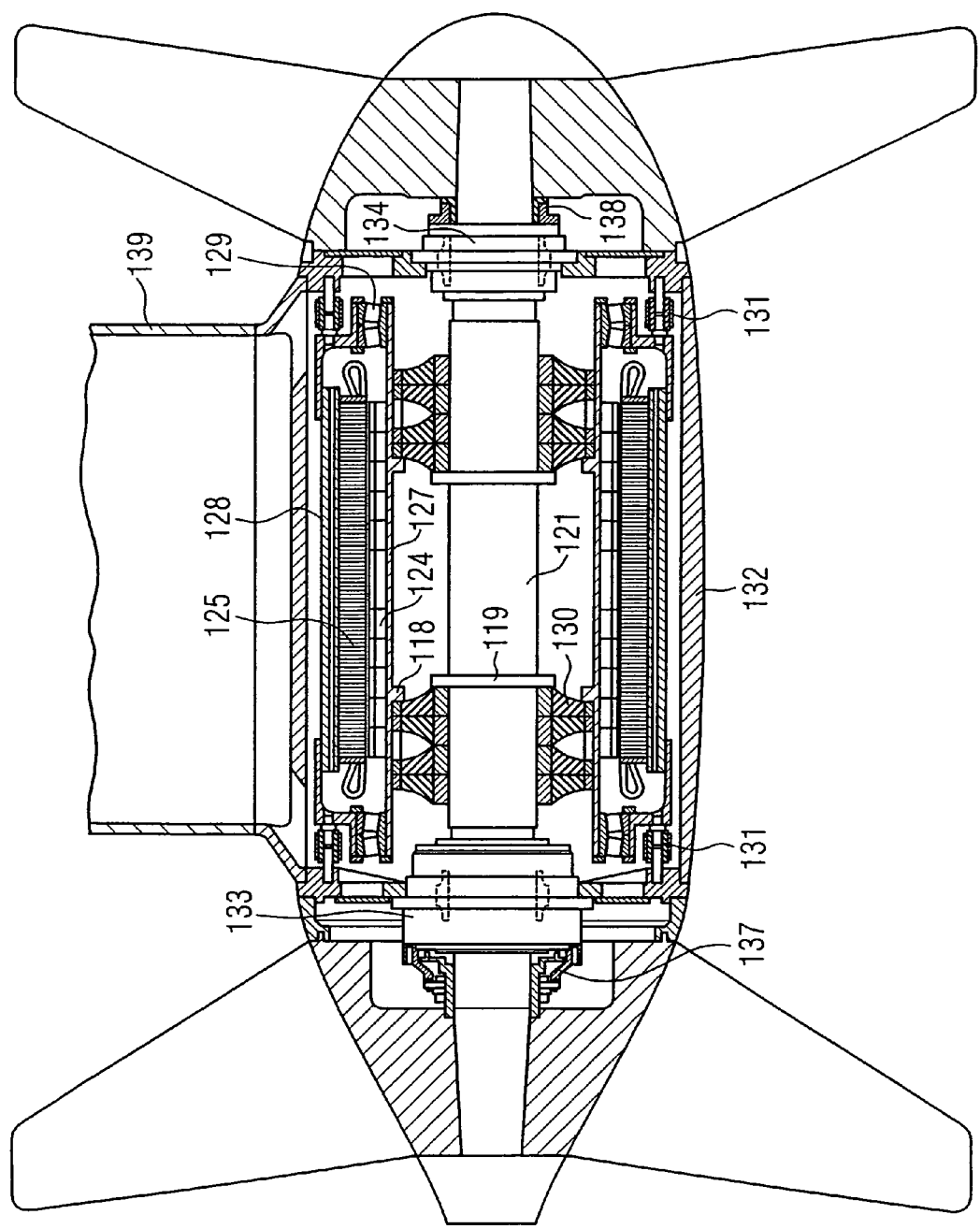
FIG. 5 and FIG. 6 show a design refinement of the arrangement as shown in FIG. 4.
Figure 6:
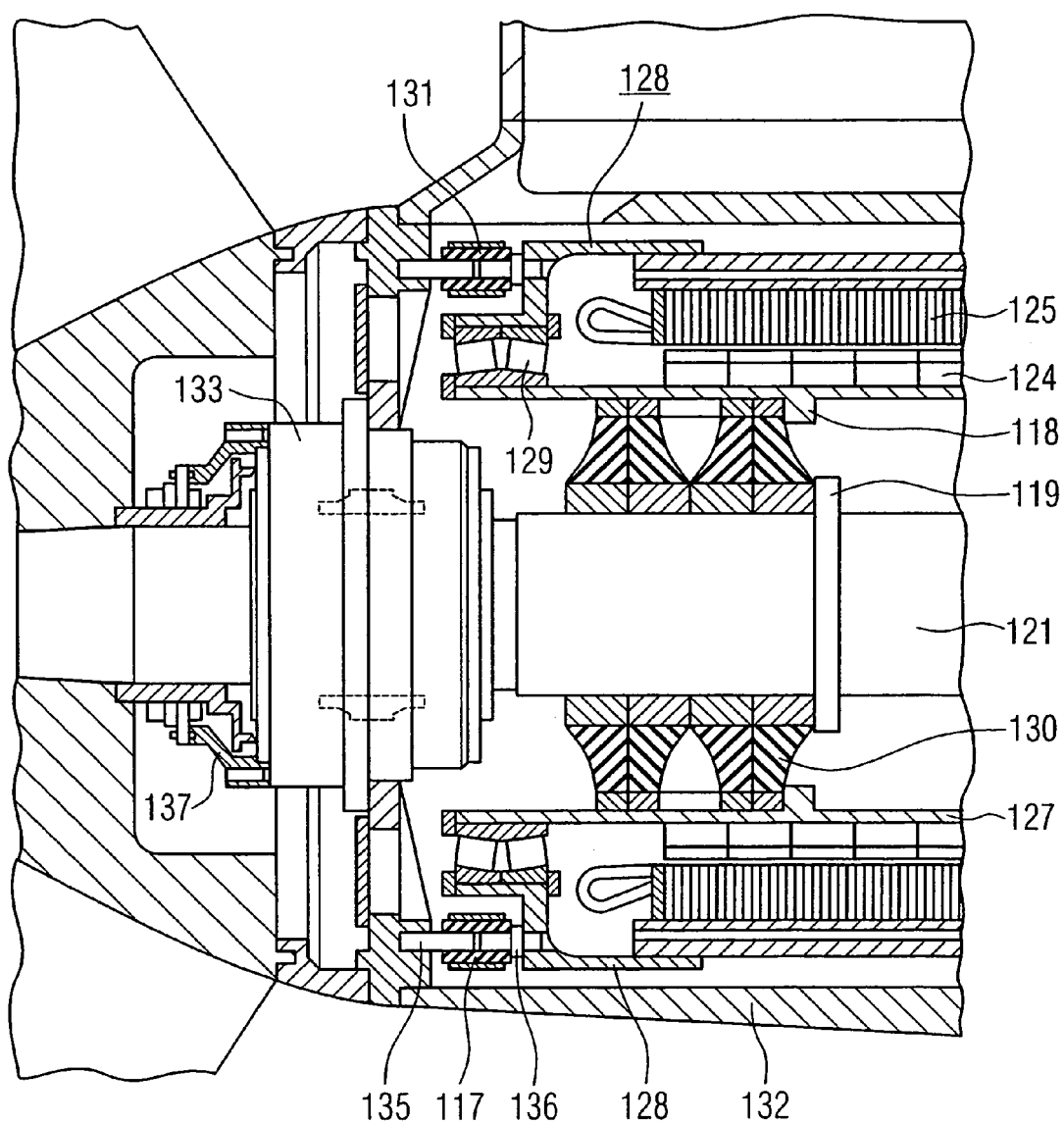

As is illustrated in FIG. 5 and in the somewhat enlarged detail in FIG. 6, the electric motor including the rotor 124 and stator 125 is arranged in a streamlined housing 132, which can be positioned by means of the mounting casing 139 like a gondola underneath the hull of a vessel. The mounting housing 128 for the stator is fixed to the mounting body 127 for the rotor 124 via rotating bearings 129 which are in the form of inclined roller bearings. This supporting body is elastically supported via damping elements 130 on the propulsion shaft 121. The damping elements 130 are in this case fixed axially on annular flanges 118 and 119.

The mounting housing 128 for the stator is supported via damping elements 131 on the housing 132. These damping elements each comprise a rubber body 117, which is mechanically coupled via bolts 135, 136 to the mounting body 128 and to the housing 132.

The propulsion shaft 121, to which the rotor is fitted, is mounted in the housing 132 by way of sliding bearings 133 and 134. The sliding bearings are in this case sealed from the surrounding water by way of sealing devices 137, 138.

In FIG. 7, 201, 202 and 203 respectively denote the propeller end, the center part and the stern end of the motor gondola which forms the housing for the electric motor. The propeller is annotated 204, and is preferably in the form of a traction propeller. The stator winding 205 as well as the rotor winding 206 are located in the motor gondola preferably being designed for direct heat dissipation via the surface. This is preferably composed of HTS material.

There is a large air gap 207 between the stator winding 205 and the rotor winding 206. The bearings which are provided for the rotor shaft, preferably sliding bearings which absorb the radial and axial forces of the rotor and of the propeller, are not shown, for the sake of simplicity; this also applies to other components in the motor gondola.

The bottom of the hull section of the vessel is annotated 208 and 209. The bottom of the hull structure in the areas 208 and 209 is designed conventionally. An elastically flexible structure 211, 212 is located between the parts 208 and 209 and, in its center, has a hollow body 210 which forms the extension of the uppermost casing part 215.

The hollow body 210 is mounted elastically and such that it can move with respect to the elastic structural parts 211, 212 via springs, for example rubber buffers 215. A sprung structure 213 is arranged on its upper face, is preferably composed of metal and allows a long spring movement. Thus, if a torpedo explodes under the electrical steering propeller, the steering propeller can move vertically to a considerable extent, dissipating the acceleration caused by the explosion pressure waves. The illustrated design allows both vertical and horizontal/vertical flexing with considerable flexing movements.

The mounting casing for the motor gondola is designed in at least two parts and has the parts 216 and 217. An elastic flange connection 218 is arranged between them and can act as an articulated joint. In this example, the casing including the parts 216 and 217 is shown as having only two parts. However, it may likewise also have further parts.

The casing part 216, to which an auxiliary rudder 219 can also be attached, is preferably composed of fiber-reinforced plastic material, while the casing part 217 is composed of aluminum, for example in the same way as the center part 202 of the motor gondola. The gondola part 201 is preferably composed of steel in order to make it possible to absorb the considerable bearing forces that occur there, while the end part 203 may likewise advantageously be composed of fiber-reinforced plastic, in order to save weight. Cooling channels are in this case advantageously incorporated in this part, through which a cooling liquid flows.

Figure 7:
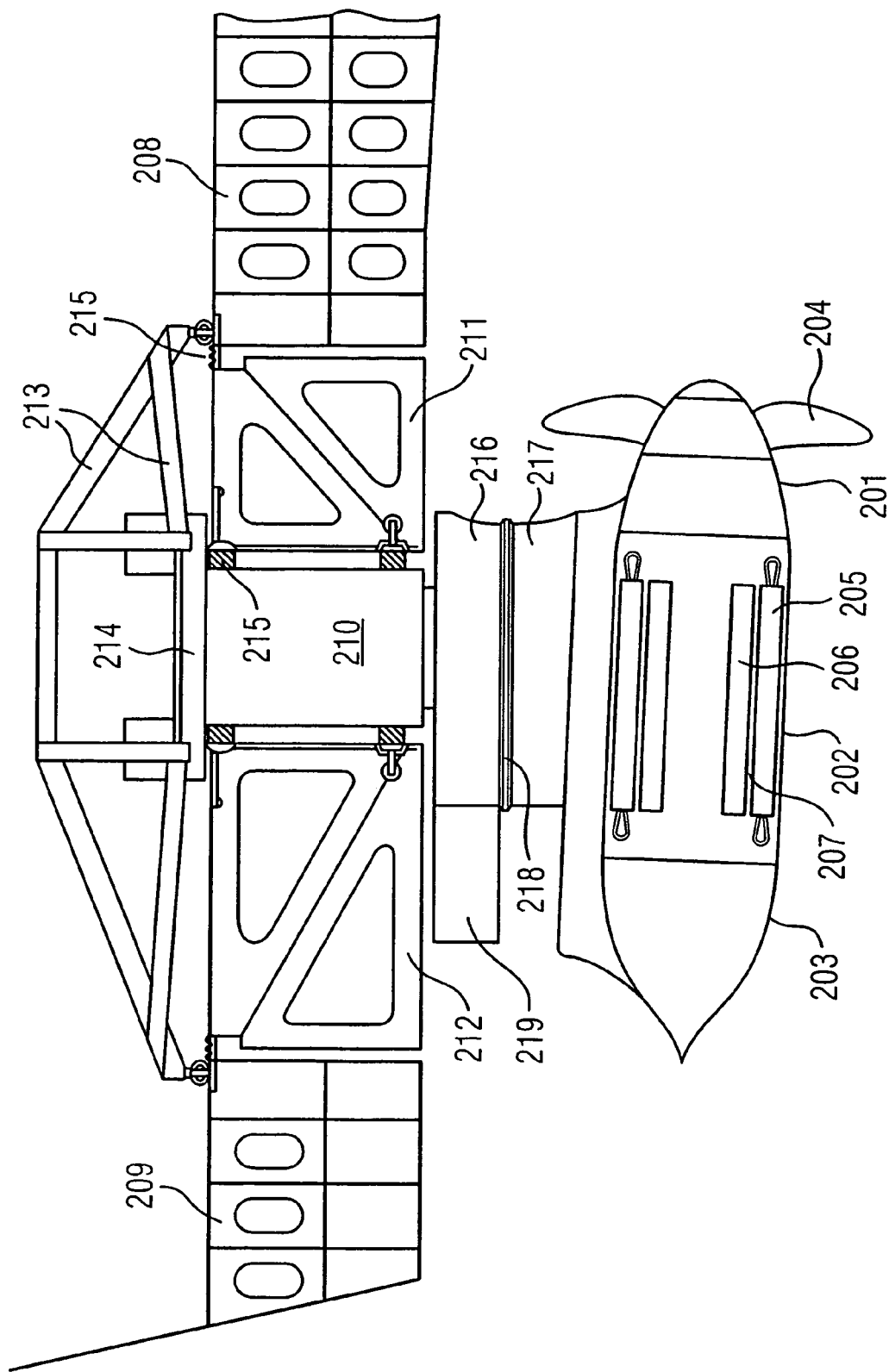
FIG. 7 shows an overall view of an electrical steering propeller for a navy vessel from the side.
Figure 8:
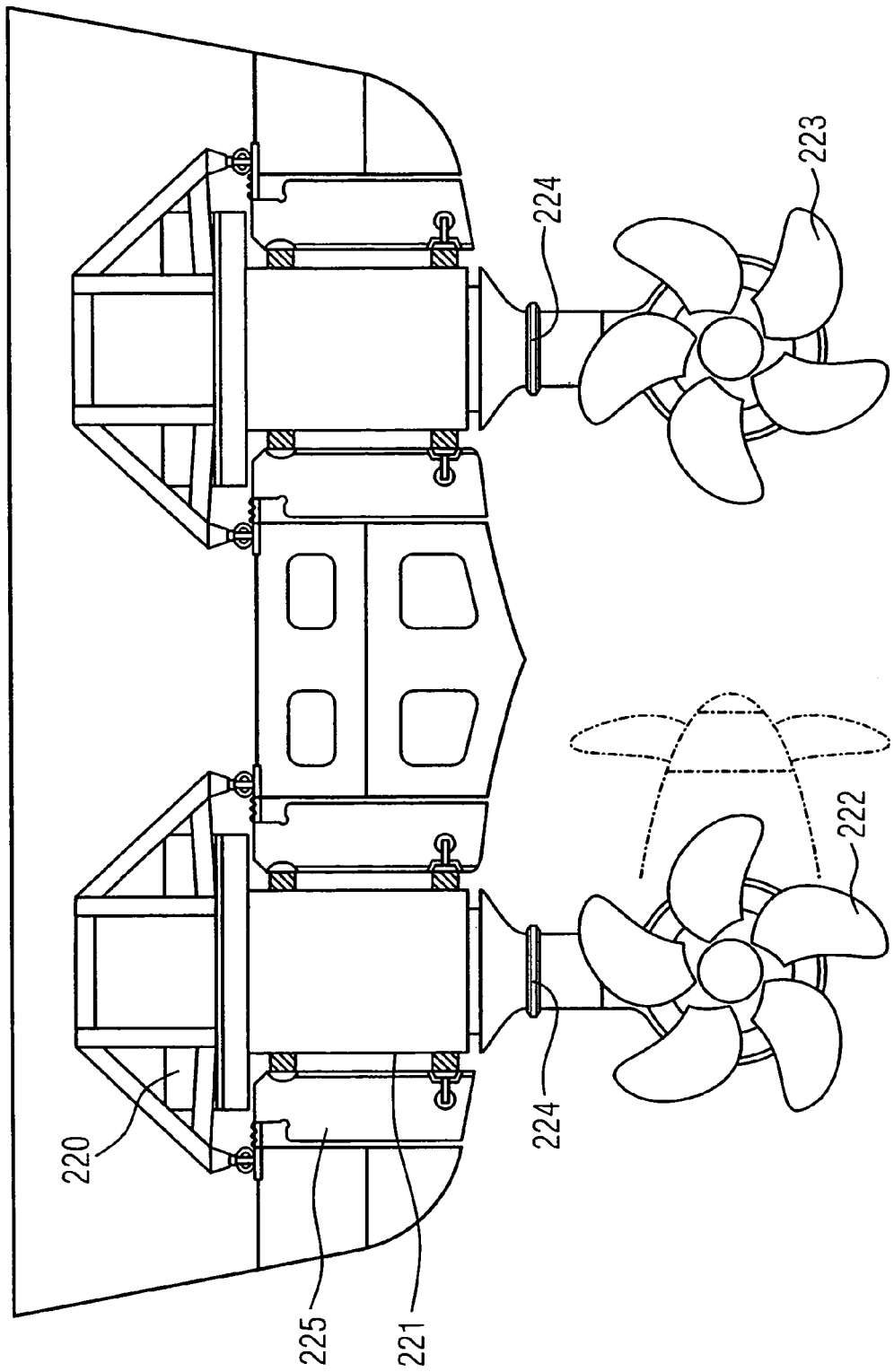
FIG. 8 shows two steering propellers, as shown in FIG. 7, from astern.

In FIG. 8, which shows two steering propellers arranged alongside one another (that is to say the propulsion units for a two-screw vessel) from astern, 222 and 223 denote the propellers of the two propulsion systems. The casings on which the two propulsion systems are suspended have at least one flange arrangement 224, which is used as an articulated joint, on the upper part. In principle, the electrical steering propellers are suspended in the same way as that shown in FIG. 7, with a hollow body 221 in the center which can move axially and horizontally between rubber buffers and steel spring structure 220. The structural unit 225, which can move elastically, in this case increases the movement capability.

Figure 9:
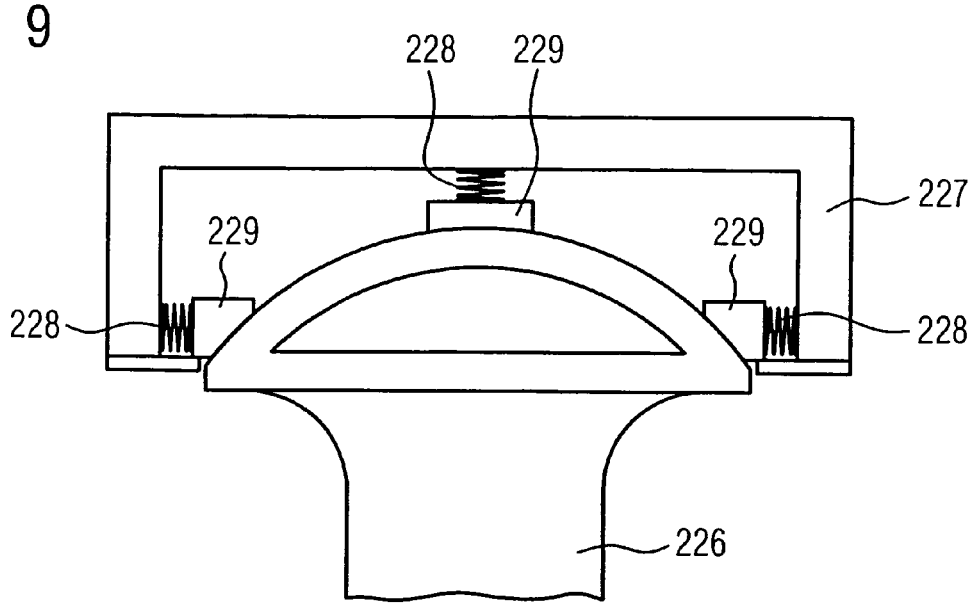
FIG. 9 shows the principle of spherical segment suspension for the electrical steering propeller.
Figure 10:
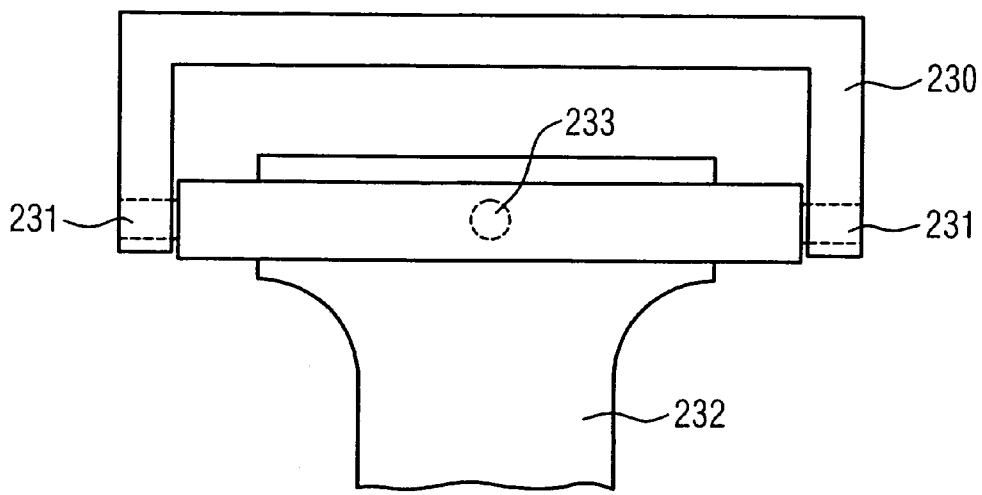
FIG. 10 shows the principle of universal-joint suspension of the electrical steering propeller.

The design configuration of the steering propellers, which can move horizontally and vertically and are suspended such that they can absorb shocks, as shown in FIGS. 7 and 8 is only schematic and by way of example. It is self-evident that appropriate variations matched to specific requirements are possible here. FIGS. 9 and 10 show two further possible solutions, with FIG. 9 showing the upper part of the electrical steering propeller casing being suspended in spherical sections, and FIG. 10 showing a corresponding suspension based on a universal joint.

In FIG. 9, 226 denotes the casing that is shown for the electrical steering propeller, which is mounted in a frame 227 and is located in the stern of the vessel and is connected to the structural elements of the stern. Spherical section parts 229 are arranged between the frame 227 and the casing head 226 and are mounted in spring elements 228, for example cup springs. The frame 227 is likewise advantageously mounted in a sprung manner in the structural elements of the stern. This results in the casing being suspended in such a way that it can flex equally in all directions. The capability to flex equally in all directions is also provided by the design in FIG. 10.

In this case, the casing head 232 is connected via bolts 231, 233 to the frame 230, which is mounted in the structural elements of the stern. This is also advantageously sprung. For longitudinal and lateral guidance, the casing for the stern propellers (which are suspended in accordance with the principle illustrated in FIG. 9 and FIG. 10) also has supporting guides, although these are not illustrated.

Figure 11:
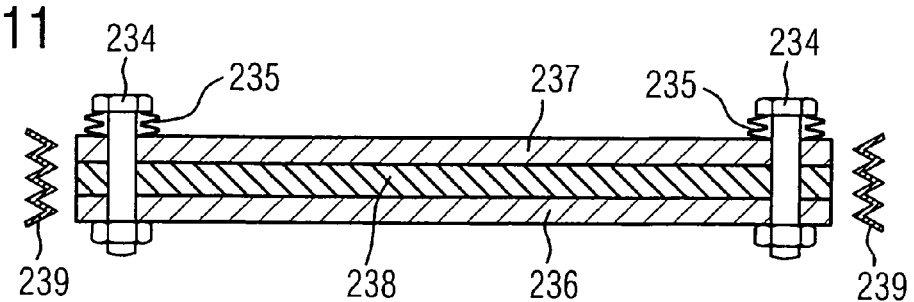
FIG. 11 shows the embodiment of a dividing joint between two casing parts.

FIG. 11 shows the principle of an elastic joint, which is in the form of an articulated joint, between two casing parts. The two flanges 236, 237 have a layer between them formed, for example, from a multilayer and fiber-reinforced elastomer material. On the outside, the flange area is protected by elastic bellows elements 239, which also extend over the screw heads 234 and are advantageously attached to the casing, which is not illustrated, by way of flexible sleeves.

In addition, underneath the screw heads 234, there are also, for example, cup springs 235 so that the joint can "give" briefly when a shock wave occurs. This results from the fact that the collars 239 are arranged externally, without water being able to enter the interior of the casing. In the same way that the collars 239 are arranged externally, they can also be arranged internally, thus producing a double seal.

Figure 12:
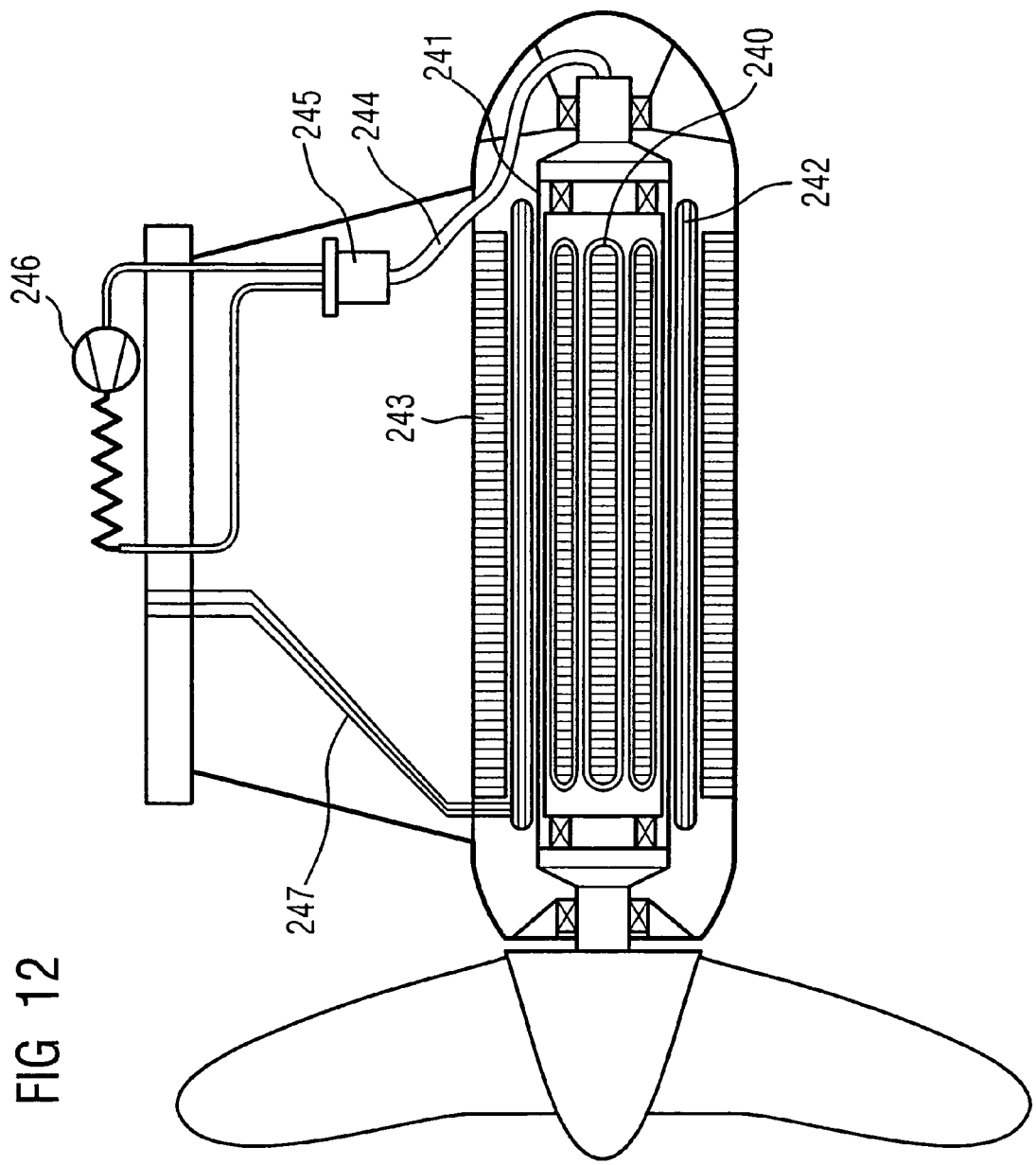
FIG. 12 shows the embodiment of the electric motor in the form of an HTS motor.

FIG. 12 shows an example of how an HTS motor is accommodated in a steering propeller. 240 in this case denotes the HTS winding, and 41 the rotor cryostat. 242 denotes the air gap winding and 243 the iron yoke. 246 denotes the cooling compressor with its coolant. Liquid coolant passes from the coolant compressor 246 to the cold head 245. The so-called "cryogenic heatpipe" 244 leads from here to the rotor cryostat 241. The electrical lines to the stator 242 are annotated 247.

The suspension systems that are shown in FIGS. 4 to 10 are only one possibility from a large number of possible designs. These designs always have the common feature that the casing can flex in response to explosion pressure waves in order in this way to compensate for the considerable pressure waves that are caused by an exploding torpedo or a mine and produce accelerations of more than 100 g for parts of the vessel, and to dissipate the pressure waves without any adverse effect on operation.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A plurality of electrical machines based on superconducting technology, each of the machines, comprising:
   a rotor with superconductors;
   a rotor cryostat;
   a rotor shaft;
   a cryogenic connection to a cryogenic conductor between the cryostat and a cold generator, the cryogenic connection including a fixed cold head and a distributor, projecting into the rotor shaft area, for a liquid coolant; and
   a non-superconducting stator, wherein
      the plurality of electrical machines are designed to be shock-resistant, wherein
      the stator, the rotor and the cryostat are decoupled via elastic elements, in terms of movement, from an outer machine housing and from the rotor shaft, wherein
      the rotor, stator and cryostat include connecting elements and bearings between them, the connecting elements and bearings resulting in movement of the rotor, stator and cryostat as a unit when accelerated by shock, the movement of the unit being greater than a vibration amplitude, and wherein
      a flexible cryogenic line is arranged between the distributor for the liquid coolant and the cryostat.

2. A plurality of electrical machines as claimed in claim 1, wherein the outer machine housing is elastically connected to a machine mount.

3. A plurality of electrical machines as claimed in claim 1, wherein an electrical steering propeller housing is arranged elastically underneath a hull of a vessel as the outer machine housing.

4. A plurality of electrical machines as claimed in claim 3, wherein the steering propeller housing is connected to the hull of the vessel elastically and flexibly.

5. A plurality of electrical machines as claimed in claim 1, wherein the outer machine housing is elastically mounted on a base frame.

6. A plurality of electrical machines as claimed in claim 5, wherein the base frame is connected to the hull of the vessel elastically and flexibly.

7. A plurality of electrical machines as claimed in claim 1, wherein the flexible cryogenic line is in the form of a coaxial double casing.

8. A plurality of electrical machines as claimed in claim 1, wherein the stator includes a copper winding, and wherein the rotor includes a superconducting air gap winding.

9. A plurality of electrical machines as claimed in claim 1, wherein the liquid coolant in the machines is liquid neon.

10. A plurality of electrical machines as claimed in claim 1, wherein the liquid coolant in the machines is liquid nitrogen.

11. A plurality of electrical machines as claimed in claim 1, wherein ferro-fluid seals are used for the liquid coolant between stationary and rotating parts of the cryogenic connection.

12. A plurality of electrical machines as claimed in claim 1, wherein the rotor shaft includes torque transmission elements composed of fiber-reinforced plastic between the cold part of the machine and the normal temperature shaft parts.

13. A plurality of electrical machines as claimed in claim 1, wherein the electrical machines include pulse tube coolers as cold generators.

14. A plurality of electrical machines as claimed in claim 13, wherein the pulse tube cooler is combined with a Stirling linear compressor.

15. A plurality of electrical machines as claimed in claim 1, wherein the cryogenic connection from the cold generator to a cold head on the machines is at least one of routed in a supporting tube and in the form of a metal-reinforced flexible tube.

16. A plurality of electrical machines as claimed in claim 15, wherein the rotation speeds of each part of the electrical motors are controllable independently of one another, and each drives one propeller.

17. A plurality of electrical machines as claimed in 15, wherein two propellers are in the form of contrarotating propellers.

18. A plurality of electrical machines as claimed in claim 1, wherein the cryogenic connection is sealed with respect to the rotor shaft by a ferro-fluid coupling, and wherein the cold head is fixed up to the machine housing, with an elastic coolant connection between these two paths.

19. A plurality of electrical machines as claimed in 18, wherein two propellers are in the form of contrarotating propellers.

20. A plurality of electrical machines as claimed in claim 1, wherein the distributor is supported in an elastically sprung manner in the rotor shaft area.

21. A plurality of electrical machines as claimed in claim 1, wherein the elastic supports in the machine include standard rubber spring elements.

22. A plurality of electrical machines as claimed in claim 1, wherein the cold generator is connected to a cooling system in the vessel.

23. A plurality of electrical machines as claimed in claim 1, wherein copper windings of the stator are liquid-cooled.

24. A plurality of electrical machines as claimed in claim 23, wherein the electrical machines include cooling channels in the stator which run at least one of radially, axially and in the circumferential direction and through which liquid flows.

25. A plurality of electrical machines as claimed in claim 1, wherein the electrical machines are at least one of motors and generators, wherein the plurality of electrical machines are designed to be shock-resistant according to requirements of a navy vessel, and wherein the superconducting technology is high-temperature superconducting technology.

26. A plurality of electrical machines as claimed in claim 1, wherein the rotor includes high-temperature superconductors.

27. A plurality of electrical machines as claimed in claim 1, wherein the outer machine housing is elastically connected to a machine mount.

28. A plurality of electrical machines as claimed in claim 1, wherein an electrical steering propeller housing is arranged elastically underneath a hull of the vessel as the outer machine housing.

29. A plurality of electrical machines as claimed in claim 1, wherein the flexible cryogenic line is in the form of a coaxial double casing.

30. A plurality of electrical machines as claimed in claim 1, wherein the electrical machines include pulse tube coolers as cold generators, arranged on an elastic mounting frame.

31. An electrical steering propeller for a navy vessel, comprising:
 at least one of the plurality of electrical machines as claimed in claim 1;
 a casing, on which at least one propeller is housed, the casing being adapted to accommodate power supply lines and being arranged under the stern of the vessel via a rotatable vessel stern casing connection, wherein the casing is designed to be elastically deformable, wherein the vessel stern casing connection is designed to allow movements of the casing with respect to the vessel stern, and wherein the at least one of the plurality of electrical machines is designed to absorb accelerations of more than 10 g.

32. An electrical propulsion device for a vessel, comprising:
 a streamlined housing, arrangeable on the lower surface of a hull of a vessel, the housing containing at least one of the plurality of electrical machines as claimed in claim 1; and
 at least one propeller, coupled to a propulsion shaft to which the rotor is fitted, wherein the stator is fixed on the rotor via rotating bearings, and wherein a unit formed from the stator and rotor is elastically supported on both the housing and the propulsion shaft.

* * * * *